United States Patent
Han et al.

(10) Patent No.: US 10,847,787 B2
(45) Date of Patent: Nov. 24, 2020

(54) POSITIVE ACTIVE MATERIAL, POSITIVE ELECTRODE AND LITHIUM BATTERY CONTAINING THE MATERIAL, METHOD OF MANUFACTURING THE MATERIAL

(71) Applicant: SAMSUNG SDI CO., LTD., Yongin-si, Gyeonggi-do (KR)

(72) Inventors: Jungmin Han, Yongin-si (KR); Jaehong Lim, Yongin-si (KR); Yongchan You, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 195 days.

(21) Appl. No.: 15/170,049

(22) Filed: Jun. 1, 2016

(65) Prior Publication Data

US 2016/0359166 A1    Dec. 8, 2016

(30) Foreign Application Priority Data

Jun. 2, 2015  (KR) .................. 10-2015-0078245

(51) Int. Cl.
| | |
|---|---|
| *H01M 4/131* | (2010.01) |
| *H01M 4/62* | (2006.01) |
| *H01M 4/36* | (2006.01) |
| *H01M 4/04* | (2006.01) |
| *H01M 4/1391* | (2010.01) |
| *H01M 4/525* | (2010.01) |

(52) U.S. Cl.
CPC ......... *H01M 4/366* (2013.01); *H01M 4/0471* (2013.01); *H01M 4/131* (2013.01); *H01M 4/1391* (2013.01); *H01M 4/62* (2013.01); *H01M 4/525* (2013.01)

(58) Field of Classification Search
None
See application file for complete search history.

(56) References Cited

U.S. PATENT DOCUMENTS

| | | | |
|---|---|---|---|
| 7,041,239 B2 | 5/2006 | Barker et al. | |
| 8,906,553 B1 * | 12/2014 | Hagh | H01M 4/366 |
| | | | 252/521.2 |
| 2009/0068563 A1 * | 3/2009 | Kanda | H01M 4/13 |
| | | | 429/306 |

(Continued)

FOREIGN PATENT DOCUMENTS

| | | |
|---|---|---|
| JP | 2006-523368 A | 10/2006 |
| JP | 2008-226463 A | 9/2008 |

(Continued)

OTHER PUBLICATIONS

Synthesis and characterization of Li1.3Al0.3Ti1.7(PO4)3-coated LiMn2O4 by wet chemical route, Rare Metals, vol. 28, No. 2, Apr. 2009, p. 122-126 (Year: 2009).*

*Primary Examiner* — Tracy M Dove
(74) *Attorney, Agent, or Firm* — Lee IP Law, P.C.

(57) ABSTRACT

A positive active material, a positive electrode and a lithium battery including the same, and a method of preparing the positive active material, the positive active material including a core, the core including a compound capable of reversibly intercalating and deintercalating lithium; and a lithium ion conductive ceramic compound on a surface of the core, the ceramic compound being doped with fluorine (F), sulfur (S), or a combination thereof.

19 Claims, 6 Drawing Sheets

(56) References Cited

U.S. PATENT DOCUMENTS

| | | | |
|---|---|---|---|
| 2010/0227221 A1* | 9/2010 | Chang | H01M 4/485 |
| | | | 429/231.95 |
| 2012/0052390 A1* | 3/2012 | He | H01M 2/1686 |
| | | | 429/221 |
| 2012/0104334 A1 | 5/2012 | Lee et al. | |
| 2012/0171570 A1* | 7/2012 | Huang | H01M 4/131 |
| | | | 429/220 |
| 2013/0122370 A1* | 5/2013 | Rho | H01M 4/5825 |
| | | | 429/220 |
| 2014/0138591 A1* | 5/2014 | Yoon | C01B 25/45 |
| | | | 252/519.14 |

FOREIGN PATENT DOCUMENTS

| | | |
|---|---|---|
| JP | 2009-076402 A | 4/2009 |
| KR | 10-2010-0004025 A | 1/2010 |
| KR | 10-1256641 B1 | 4/2013 |

* cited by examiner

POSITIVE ACTIVE MATERIAL, POSITIVE ELECTRODE AND LITHIUM BATTERY CONTAINING THE MATERIAL, METHOD OF MANUFACTURING THE MATERIAL

CROSS-REFERENCE TO RELATED APPLICATION

Korean Patent Application No. 10-2015-0078245, filed on Jun. 2, 2015, in the Korean Intellectual Property Office, and entitled: "Positive Active Material, Positive Electrode and Lithium Battery Containing the Material, Method of Manufacturing the Material," is incorporated by reference herein in its entirety.

BACKGROUND

1. Field

Embodiments relate to a positive active material, a positive electrode and a lithium battery including the positive active material, and a method of manufacturing the positive active material.

2. Description of the Related Art

Lithium secondary batteries used in portable electronic devices, such as mobile phones, personal digital assistants (PDAs), laptop computers, electric bicycles, or electric vehicles may have discharge voltages twice that of other batteries. Thus, lithium secondary batteries may have high energy density.

Lithium secondary batteries are reusable batteries that may be repeatedly charged and discharged. For example, lithium secondary batteries may generate electrical energy by oxidation and reduction reactions during intercalation/deintercalation of lithium ions at positive and negative electrodes. An organic electrolyte solution or a polymer electrolyte solution (including an active material capable of intercalating and deintercalating lithium ions) may be filled between the positive electrode and the negative electrode.

Main characteristics of the lithium secondary batteries may include capacity, lifespan, and stability. Primary characteristics, such as driving voltage and capacity, of the lithium secondary battery may be determined according to an active material used in an electrode. The primary characteristics may be related to a thermodynamic stability of the active material. However, in terms of a battery, chemical reactions may differ depending on, e.g., a type of a binder, a composition of an electrolyte solution, interaction between the electrolyte solution and an active material, and a type of the active material. Such secondary characteristics may be observed after manufacturing a battery, and this is because chemical environment of an electrode may change by additional chemical reactions that appear differently according to the composition of the battery.

SUMMARY

Embodiments are directed to a positive active material, a positive electrode and a lithium battery including the positive active material, and a method of manufacturing the positive active material.

The embodiments may be realized by providing a positive active material including a core, the core including a compound capable of reversibly intercalating and deintercalating lithium; and a lithium ion conductive ceramic compound on a surface of the core, the ceramic compound being doped with fluorine (F), sulfur (S), or a combination thereof.

The ceramic compound may be a phosphate compound represented by Formula 1:

$$Li_{1+x}M_xM'_{2-x}(PO_{4-y/3})_3M''_y \qquad \text{[Formula 1]}$$

wherein, in Formula 1, M may be Al, Cr, Ga, Fe, Sc, In, Y, La, Sc, or a combination thereof; M' may be Ti, Ge, Zr, or a combination thereof; M" may be F, S, or a combination thereof; $0<x\leq0.7$; and $0<y\leq0.05$.

The ceramic compound may be a phosphate compound represented by Formula 2:

$$Li_{1+x}M_xTi_{2-x}(PO_{4-y/3})_3F_y \qquad \text{[Formula 2]}$$

wherein, in Formula 2, M may be Al, Cr, Ga, Fe, Sc, In, Y, La, Sc, or a combination thereof; $0<x\leq0.7$; and $0<y\leq0.05$.

The ceramic compound may be a phosphate compound represented by Formula 3:

$$Li_{1+x}Al_xTi_{2-x}(PO_{4-y/3})_3F''_y \qquad \text{[Formula 3]}$$

wherein, in Formula 3, $0<x\leq0.7$, and $0<y\leq0.05$.

The ceramic compound may be $Li_{1.3}Al_{0.3}Ti_{1.7}(PO_{4-y/3})_3F_y$, in which $0<y\leq0.05$.

The ceramic compound may be attached to a surface of the core in the form of a layer or an island.

Based on a total weight of the core and the ceramic compound, an amount of the core may be greater than about 95 wt % and about 99.9 wt % or less, and an amount of the ceramic compound may be about 0.1 wt % or greater and less than about 5 wt %.

Based on a total weight of the core and the ceramic compound, an amount of the core may be about 96 wt % to about 98.5 wt %, and an amount of the ceramic compound is about 1.5 wt % to about 4 wt %.

The core may include at least one selected from $LiCoO_2$, $LiNiO_2$, $LiMnO_2$, $LiMn_2O_4$, $Li(Ni_aCo_bAl_c)O_2$, $Li(Ni_aCo_bMn_c)O_2$, where $0<a<1$, $0<b<1$, $0<c<1$ and $a+b+c=1$, $LiNi_{1-Y}Co_YO_2$, $LiCo_{1-Y}Mn_YO_2$, $LiNi_{1-Y}Mn_YO_2$, where, $0\leq Y<1$, $Li(Ni_aCo_bMn_c)O_4$, where, $0<a<2$, $0<b<2$, $0<c<2$ and $a+b+c=2$, $LiMn_{2-z}Ni_zO_4$, $LiMn_{2-z}Co_zO_4$, where, $0<Z<2$, $LiCoPO_4$, $LiFePO_4$, $LiFePO_4$, $V_2O_5$, TiS, and MoS.

The ceramic compound may be a crystalline solid that includes Li, Al, Ti, P, O, and at least one of F or S.

The embodiments may be realized by providing a positive electrode for a lithium battery, the positive electrode including the positive active material according to an embodiment.

The embodiments may be realized by providing a lithium battery including a positive electrode including the positive active material according to an embodiment; a negative electrode facing the positive electrode; and an electrolyte between the positive electrode and the negative electrode.

The lithium battery may operate within a voltage range of about 4.3 V to about 4.6 V.

The embodiments may be realized by providing a method of preparing a positive active material, the method including forming a precursor mixture for manufacturing a ceramic compound, the precursor mixture including a F and/or S raw material; obtaining the ceramic compound by heat-treating the precursor mixture; preparing a coating solution by mixing the ceramic compound in an organic solvent; coating the coating solution on a surface of a core, the core including a compound capable of reversibly intercalating and deintercalating lithium; and heat-treating the core coated with the coating solution.

The ceramic compound may include a compound represented by Formula 3:

$$Li_{1+x}Al_xTi_{2-x}(PO_{4-y/3})_3F''_y \qquad \text{[Formula 3]}$$

wherein, in Formula 3, $0<x\leq0.7$ and $0<y\leq0.05$.

Heat-treating the mixture to obtain the ceramic compound may include a primary heat-treating process that is performed at a temperature of about 650° C. to about 1,000° C. for about 1 hour to about 5 hours; and a secondary heat-treating process that is performed at a temperature of about 800° C. to about 1,200° C. for about 1 hour to about 10 hours.

Heat-treating the mixture to obtain the ceramic compound may include a primary heat-treating process; and a secondary heat-treating process that is performed at a temperature greater than that of the primary heat-treating process.

Heat-treating the mixture to obtain the ceramic compound may further include a third heat-treating process.

Heat-treating the mixture to obtain the ceramic compound may include cooling the mixture between performing the primary heat-treating process and the secondary heat-treating.

The method may further include drying the precursor mixture prior to the heating heat-treating the precursor mixture.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
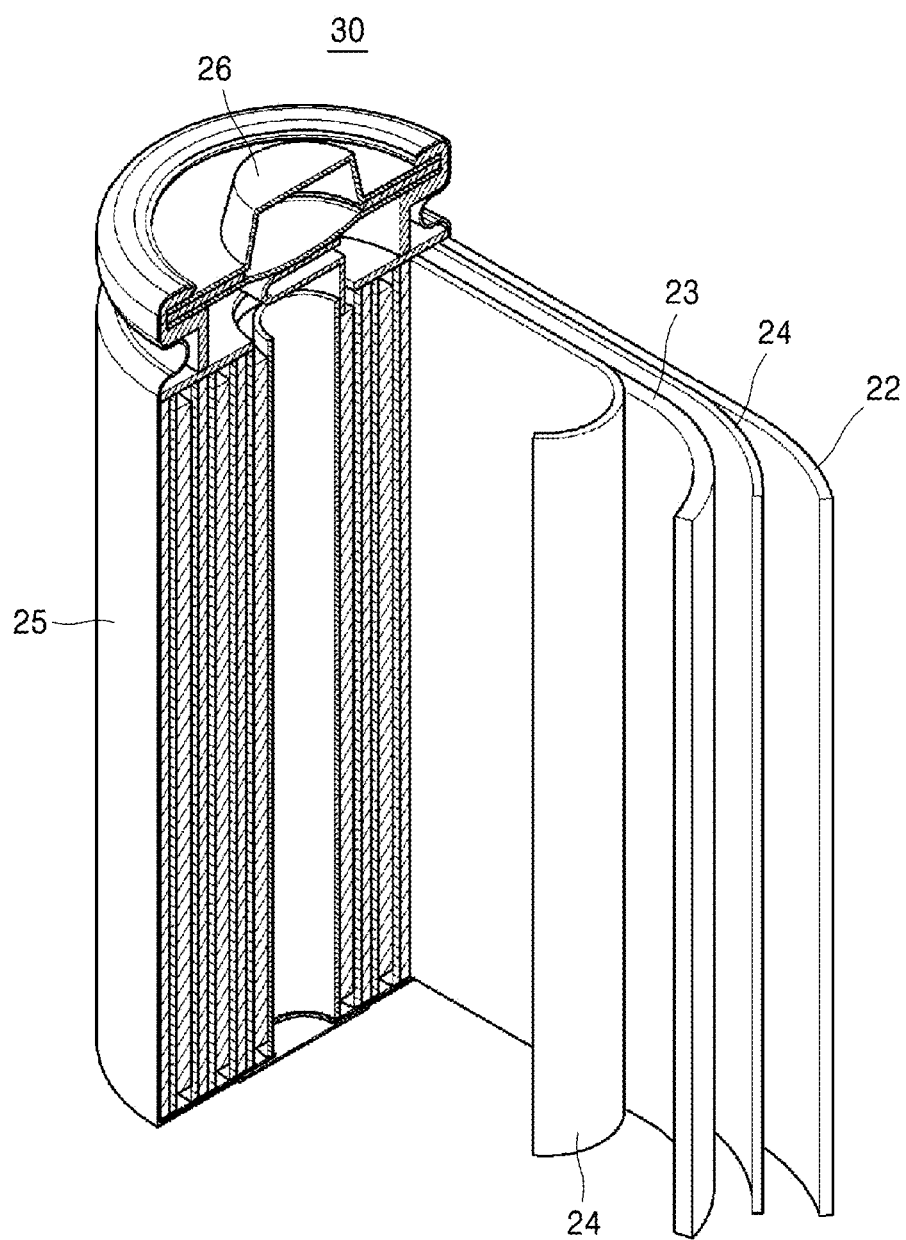
FIG. 1 illustrates a schematic perspective view of a structure of a lithium battery according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, the term "and/or" includes any and all combinations of one or more of the associated listed items. Expressions such as "at least one of," when preceding a list of elements, modify the entire list of elements and do not modify the individualelements of the list.

According to an embodiment, provided is a positive active material to help improve performance of a lithium battery and at the same time to secure stability of the lithium battery at a high voltage of 4.5 V or higher. For example, side reactions (that may otherwise occur between an active material and an electrolyte) may be controlled by coating a ceramic compound having low resistance and high lithium ion conductivity on a surface of a core.

According to an embodiment, the positive active material may include a core that includes a compound capable of reversibly intercalating and deintercalating lithium; and a lithium ion conductive ceramic compound that is attached on the surface of the core. The lithium ion conductive ceramic compound may be doped with, e.g., fluorine (F), sulfur (S), or a combination thereof.

The compound included in the core may be a suitable compound capable of reversibly intercalating and deintercalating lithium. Examples of the compound may include $Li_aA_{1-b}X_bD_2$ (where, $0.90 \le a \le 1.8$ and $0 \le b \le 0.5$); $Li_aA_{1-b}X_bO_{2-c}D_c$ (where, $0.90 \le a \le 1.8$, $0 \le b \le 0.5$, and $0 \le c \le 0.05$); $LiE_{2-b}X_bO_{4-c}D_c$ (where, $0 \le b \le 0.5$ and $0 \le c \le 0.05$); $Li_aNi_{1-b-c}Co_bX_cD_\alpha$ (where, $0.90 \le a \le 1.8$, $0 \le b \le 0.5$, $0 \le c \le 0.05$, and $0 < \alpha \le 2$); $Li_aNi_{1-b-c}Co_bX_cO_{2-\alpha}T_\alpha$ (where, $0.90 \le a \le 1.8$, $0 \le b \le 0.5$, $0 \le c \le 0.05$, and $0 < \alpha < 2$); $Li_aNi_{1-b-c}Co_bX_cO_{2-\alpha}T_2$ (where, $0.90 \le a \le 1.8$, $0 \le b \le 0.5$, $0 \le c \le 0.05$, and $0 < \alpha < 2$); $Li_aNi_{1-b-c}Mn_bX_cD_\alpha$ (where, $0.90 \le a \le 1.8$, $0 \le b \le 0.5$, $0 \le c \le 0.05$, and $0 < \alpha \le 2$); $Li_aNi_{1-b-c}Mn_bX_cO_{2-\alpha}T_\alpha$ (where, $0.90 \le a \le 1.8$, $0 \le b \le 0.5$, $0 \le c \le 0.05$, and $0 < \alpha < 2$); $Li_aNi_{1-b-c}Mn_bX_cO_{2-\alpha}T_2$ (where, $0.90 \le a \le 1.8$, $0 \le b \le 0.5$, $0 \le c \le 0.05$, and $0 < \alpha < 2$); $Li_aNi_bE_cG_dO_2$ (where, $0.90 \le a \le 1.8$, $0 \le b \le 0.9$, $0 \le c \le 0.5$, and $0.001 \le d \le 0.1$); $Li_aNi_bCo_cMn_dG_eO_2$ (where, $0.90 \le a \le 1.8$, $0 \le b \le 0.9$, $0 \le c \le 0.5$, $0 \le d \le 0.5$, and $0.001 \le e \le 0.1$); $Li_aNiG_bO_2$ (where, $0.90 \le a \le 1.8$ and $0.001 \le b \le 0.1$); $Li_aCoG_bO_2$ (where, $0.90 \le a \le 1.8$ and $0.001 \le b \le 0.1$); $Li_aMnG_bO_2$ (where, $0.90 \le a \le 1.8$ and $0.001 \le b \le 0.1$); $Li_aMn_2G_bO_4$ (where, $0.90 \le a \le 1.8$ and $0.001 \le b \le 0.1$); $QO_2$; $QS_2$; $LiQS_2$; $V_2O_5$; $LiV_2O_5$; $LiZO_2$; $LiNiVO_4$; $Li_{(3-f)}J_2(PO_4)_3$ (where, $0 \le f \le 2$); $Li_{(3-f)}Fe_2(PO_4)_3$ (where, $0 \le f \le 2$); and $LiFePO_4$.

Here, A may be selected from Ni, Co, Mn, and a combination thereof; X may be selected from Al, Ni, Co, Mn, Cr, Fe, Mg, Sr, V, a rare earth element, and a combination thereof; D may be selected from O, F, S, P, and a combination thereof; E may be selected from Co, Mn, and a combination thereof; T may be selected from F, S, P, and a combination thereof; G may be selected from Al, Cr, Mn, Fe, Mg, La, Ce, Sr, V, and a combination thereof; Q may be selected from Ti, Mo, Mn, and a combination thereof; Z may be selected from Cr, V, Fe, Sc, Y, and a combination thereof; and J may be selected from V, Cr, Mn, Co, Ni, Cu, and a combination thereof.

In an implementation, the core may include at least one selected from, e.g., $LiCoO_2$, $LiNiO_2$, $LiMnO_2$, $LiMn_2O_4$, $Li(Ni_aCo_bAl_c)O_2$, $Li(Ni_aCo_bMn_c)O_2$ (where, $0 < a < 1$, $0 < b < 1$, $0 < c < 1$, and $a+b+c=1$), $LiNi_{1-Y}Co_YO_2$, $LiCo_{1-Y}Mn_YO_2$, $LiNi_{1-Y}Mn_YO_2$ (where, $0 \le Y < 1$), $Li(Ni_aCo_bMn_c)O_4$ (where, $0 < a < 2$, $0 < b < 2$, $0 < c < 2$, and $a+b+c=2$), $LiMn_{2-z}Ni_zO_4$, $LiMn_{2-z}Co_zO_4$ (where, $0 < Z < 2$), $LiCoPO_4$, $LiFePO_4$, $LiFePO_4$, $V_2O_5$, TiS, and MoS.

An average particle diameter (D50) of the core may be about 50 μm or less, e.g., in a range of about 1 μm to about 50 μm, about 1 μm to about 50 μm, about 1 μm to about 30 μm, or about 25 μm to about 20 μm.

As used herein, the average particle diameter (D50) denotes a cumulative average particle diameter that corresponds to 50 vol % in a cumulative distribution curve of a particle diameter having the total volume as 100%. The average particle diameter (D50) may be measured by using a suitable method, and an example of the method may include measuring by a particle size analyzer or measuring from a TEM or SEM image. In an implementation, the method may include measuring with a meter by dynamic light-scattering, performing data analysis to count the number of particles with respect to each of size ranges, and thus D50 may be easily obtained from the resulting calculation.

The positive active material may include the ceramic compound having high lithium ion conductivity, and the ceramic compound may be attached to at least a part of the surface of the core (that includes the compound capable of reversibly intercalating and deintercalating lithium).

In an implementation, a phosphate compound having a NASICON-type crystalline structure may be used as the ceramic compound of high lithium ion conductivity. For example, the ceramic compound may be a phosphate compound that is represented by Formula 1.

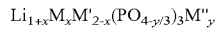

$$Li_{1+x}M_xM'_{2-x}(PO_{4-y/3})_3M''_y \quad \text{[Formula 1]}$$

In Formula 1,

M may be at least one element selected from, e.g., Al, Cr, Ga, Fe, Sc, In, Y, La, and Sc. M' may be at least one element selected from, e.g., Ti, Ge, and Zr. M'' may be at least one element selected from, e.g., F, S, and a combination thereof. x and y may satisfy the following relations: $0<x\leq0.7$ and $0<y\leq0.05$.

In the phosphate compound, some tetravalent elements M' may be substituted or replaced with a trivalent element M such as Al, Cr, Ga, Fe, Sc, In, Y, La, or Sc. Thus, a porosity of the phosphate compound may be lower than that of an unsubstituted phosphate compound. Also, some oxygen sites (e.g., of the phosphate group) may be doped or replaced with fluorine (F), sulfur (S), or a combination thereof, and the phosphate compound may have decreased resistance and high ion conductivity, compared to those of an un-doped ceramic compound (e.g., a ceramic compound that is not doped with fluorine (F), sulfur (S), or a combination thereof).

In Formula 1, $0<x\leq0.7$. Also, $0<y\leq0.05$. An appropriate electrochemical effect may be obtained when x and y are within these ranges.

In Formula 1, the range of y, which denotes an amount of fluorine (F) or sulfur (S) used for or that results from the doping process may be represented by $0<y\leq0.05$. For example, y may be in the range of $0<y\leq0.04$, $0<y\leq0.03$, $0<y\leq0.02$, or $0<y\leq0.01$. When y is within these ranges, a capacity retention rate and lifespan characteristics of a lithium battery may improve.

A lithium ion conductivity of the ceramic compound may be about $1\times10^{-3}$ S/cm or higher, e.g., about $3\times10^{-3}$ S/cm to about $7\times10^{-3}$ S/cm. The ceramic compound having such high lithium ion conductivity may facilitate an ion transfer reaction on a surface of the core of the positive active material, and thus battery efficiency may be improved.

In an implementation, the phosphate compound represented by Formula 1, e.g., may include lithium and titanium (Ti), where M' is Ti, and may be doped with fluorine (F). For example, the ceramic compound may be represented by Formula 2:

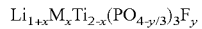

$$Li_{1+x}M_xTi_{2-x}(PO_{4-y/3})_3F_y \quad \text{[Formula 2]}$$

In Formula 2, M may be at least one element selected from, e.g., Al, Cr, Ga, Fe, Sc, In, Y, La, and Sc. x and y may satisfy the following relations: $0<x\leq0.7$ and $0<y\leq0.05$.

The ceramic compound may be, e.g., $Li_{1+x}Al_xTi_{2-x}(PO_{4-y/3})_3F_y$ (where, x and y are the same as defined above, and also referred to as 'F-doped LATP'), that includes some Ti that are substituted or replaced with Al, and that is doped with fluorine.

In an implementation, the ceramic compound may be attached to the, e.g., surface of the, core in the form of a layered structure or an island structure. Here, the term "island" denotes a shape that could be semi-spherical, non-spherical, or amorphous with a predetermined volume. The term "island" may also refer to the ceramic compound discontinuously attached on the surface of the core.

When the ceramic compound is attached to the surface of the core in the form of a layered structure, a coating layer of the ceramic compound may have a suitable thickness. Maintaining a sufficiently thin thickness of the coating layer may help prevent an undesirable decrease in an amount of an active material per unit volume of an electrode and a capacity of the battery. Maintaining a sufficiently thick thickness of the coating layer may help ensure that the desired effects to suppress side reactions between the core and the electrolyte are achieved. In an implementation, a thickness of the coating layer formed of the ceramic compound may be, e.g., about 0.1 μm to about 10 μm.

When the ceramic compound is attached to the surface of the core in the form of an island structure, a diameter of the ceramic compound may be, e.g., about 0.1 μm to about 4 μm, so that by the ceramic compound may be attached to the core at an appropriate density.

In the positive active material, based on the total weight of the core and the ceramic compound, an amount of the core may be greater than about 95 wt % and about 99.9 wt % or less, and an amount of the ceramic compound may be about 0.1 wt % or greater and less than about 5 wt %. For example, the core may account for greater than about 95 wt % and about 99.9 wt % or less of the total weight of core and the ceramic compound, and the ceramic compound may account for about 0.1 wt % or greater and less than about 5 wt %, of the total weight of core and the ceramic compound. For example, in the positive active material, an amount of the core may be in a range of about 96 wt % to about 99 wt %, and an amount of the ceramic compound may be in a range of about 1 wt % to about 4 wt %. For example, in the positive active material, an amount of the core may be in a range of about 96 wt % to about 98.5 wt %, and an amount of the ceramic compound may be in a range of about 1.5 wt % to about 4 wt %. When the amounts of the core and the ceramic compound are within these ranges, side reactions between the core and the electrolyte may be effectively suppressed, and a discharge capacity of the lithium battery may be increased.

In an implementation, an average particle diameter D50 of the positive active material may be about 50 μm or less. Maintaining the particle diameter of the positive active material at about 50 μm or less may help prevent a deterioration in characteristics of the positive active material according to an increase in a charge/discharge rate. For example, an average particle diameter D50 of the positive active material may be about 1 μm to about 30 μm, about 5 μm to about 25 μm, or about 10 μm to about 20 μm.

The core may be coated with the ceramic compound with high lithium ion conductivity, which may help reduce and/or prevent direct contact with an electrolyte solution in the lithium battery. Thus, side reactions between the core and the electrolyte in high-temperature/high-voltage environment may be suppressed. Accordingly, without using high-cost additives, stability of a lithium battery in high-temperature/high-voltage environment may be secured, and the lithium battery may have excellent capacity and cycle characteristics.

According to another embodiment, a method of preparing a positive active material will be described hereinafter.

In an implementation, the method of preparing the positive electrode material may include, e.g., forming a precursor mixture for a ceramic compound (e.g. by mixing a Li raw material, an Al raw material, a Ti raw material, a $PO_4$ raw material, and a F and/or S raw material); obtaining a ceramic compound (e.g. by heat-treating the precursor mixture); preparing a coating solution (e.g. by mixing the ceramic compound in an organic solvent); coating the coating solution on a surface of a core that includes a compound capable of reversibly intercalating and deintercalating lithium; and heat-treating the core coated with the coating solution.

In order to produce the ceramic compound, e.g., a F-doped or S-doped LATP, firstly, a Li raw material, an Al raw material, a Ti raw material, a $PO_4$ raw material, and a F and/or S raw material may be mixed. An amount of each element of the F-doped or S-doped LATP may vary, and amounts of the raw materials added to prepare the mixture may be appropriately controlled to correspond to the F-doped or S-doped LATP.

Examples of the Li raw material may include $Li_2CO_3$, $LiNO_3$, and $Li_3PO_4$. Examples of the Al raw material may include $Al_2O_3$, $AlPO_4$, and $Al(NO_3)_3$. Examples of the Ti raw material may include $TiO_2$ and $TiP_2O_7$. Examples of the $PO_4$ raw material may include $(NH_4)_2HPO_4$, $NH_4H_2PO_4$, $(NH_4)_2HPO_4$, and $Li_3PO_4$. Examples of the F raw material may include LiF, $MgF_2$, $SrF_2$, $BeF_2$, $CaF_2$, $NH_4F$, $NH_4HF_2$, and $(NFl_4)_3AlF_6$. Examples of the S raw material may include S, $SO_3$, $H_2SO_4$, and $D_2SO_4$.

The mixing of the raw materials may be performed by, e.g., ball-milling. Balls that may be used in the ball-milling may include, e.g., zirconium balls, and a size of the balls may be, e.g., about 0.3 mm to about 10 mm.

The ball-milling may be performed for, e.g., about 4 hours to about 48 hours, so that the ceramic compound may be prepared in an appropriate size. If the reactants are to be homogeneously mixed, various techniques in addition to the ball milling may be used.

The precursor mixture may be dried prior to heat-treatment. The drying process may be performed at about 100° C. to about 400° C.

Thereafter, the precursor mixture may be heat-treated. In an implementation, the heat-treating of the mixture may be performed in a single process or may be performed in a process including at least two steps. In an implementation, the method may further include a pulverizing process after each step of the heat-treating process.

The heat-treating process may include a primary heat-treatment and a secondary heat-treatment.

For example, a temperature of the precursor mixture may be increased to about 650° C. to about 1,000° C. at a temperature increasing rate in a range of about 0.5° C./min to about 2° C./min, and the primary heat-treating process may be performed at the increased temperature for about 1 hour to about 5 hours. When a temperature increasing rate and a temperature of the heat-treatment are within these ranges, side reactions may be suppressed. The precursor mixture including the raw materials may form a F-doped or S-doped LATP through the primary heat-treatment.

Then, the F-doped or S-doped LATP obtained may be cooled in the air.

In an implementation, the naturally or air cooled F-doped or S-doped LATP may be further pulverized. Through the pulverizing process, the F-doped or S-doped LATP may be pulverized into a homogeneous size having a diameter of about 0.1 μm to about 4 μm. The pulverizing process may be performed by using a suitable technique that may pulverize a material into particles of a homogenous size. For example, the technique may include using a paint shaker, using a homogenizer, using a PD mix, or ball-milling.

Balls that may be used in the ball-milling may include, e.g., zirconium balls, and a size of the balls may be, e.g., about 0.3 mm to about 5 mm.

For example, a temperature of the mixture may be increased to about 800° C. or higher, e.g., about 900° C. or higher or about 950° C. or higher, (e.g., as a secondary heat treatment) as a temperature higher than the temperature of the primary heat-treatment at a temperature increasing rate in a range of about 0.5° C./min to about 10° C./min. The secondary heat-treating process may be performed at the increased temperature for about 1 hour to about 10 hours. When a temperature increasing rate and a temperature of the second heat-treatment are within these ranges, the reaction may be controlled, and homogeneity of a degree of crystallization of the obtained ceramic compound may be secured. In an implementation, the temperature of the secondary heat-treatment may be, e.g., about 800° C. to about 1,200° C. A degree of crystallization of the F-doped or S-doped LATP may improve through the secondary heat-treatment.

Next, the F-doped or S-doped LATP thus obtained may be cooled to a temperature of about 300° C. at a rate of about 50° C./min to about 200° C./min, and then the F-doped or S-doped LATP may be cooled in the air.

In an implementation, the secondary heat-treated F-doped or S-doped LATP may be further pulverized. The pulverizing process may be the same as described above.

In an implementation, the F-doped or S-doped LATP may undergo a heat-treating process including 3 steps or more.

In an implementation, the ceramic compound thus obtained may be the phosphate compound represented by Formula 1 as described above. For example, the ceramic compound may be $Li_{1+x}Al_xTi_{2-x}(PO_{4-y/3})_3F_y$ (where, $0<x\leq0.7$ and $0<y\leq0.05$).

Next, the ceramic compound thus prepared may be homogenously dispersed in the organic solvent to prepare the coating solution. Here, a milling process, such as ball-milling, may be performed on the ceramic compound to homogenously disperse the ceramic compound in the organic solvent.

The milling process may be performed by, e.g., using a beads mill, a high energy ball mill, a planetary mill, a stirred ball mill, or a vibration mill. The beads mill or the ball mill may be formed of a chemically inert material that does not react with the ceramic compound, e.g., the beads mill or the ball mill may be formed of a zirconium material. A size of the beads mill or the ball mill may be in a range of about 0.3 mm to about 10 mm.

Examples of the organic solvent may include ethanol, hexane, heptanes, isopropanol, and NMP. For example, a precipitating process may be performed for about 6 hours to about 8 hours so that the ceramic compound may be sufficiently precipitated or dispersed in the organic solvent.

The coating solution thus prepared may be coated on a surface of the core including a compound capable of reversibly intercalating and deintercalating lithium.

Materials included in the core may be the same as described above.

The coating process may be performed by a suitable process, e.g., sol-gel coating, spray coating, or dip coating.

In the case of dip-coating, mixing of the mixture may be needed so that the ceramic material and the organic material or solvent are homogenously dispersed and attached on the surface of the core particle after adding the core material to the coating solution. The mixing may be for homogenous dispersion of core particles and a composite material, and thus a suitable technique may be used as long as a particle diameter is not changed due to excessive mixing. For example, the mixture may be ball-milled, and balls used in the ball-milling may be, e.g., zirconium balls, and a size of the balls may be, e.g., about 0.3 mm to about 10 mm. The ball-milling process may be performed for about 8 hours to about 48 hours.

Next, the core coated with the coating solution may be heat-treated to obtain a positive active material having the ceramic compound attached on a surface of the core.

In the heat-treating process, a temperature of the mixture may be increased to about 600° C. to about 950° C. at a temperature increasing rate in a range of about 0.5° C./min to about 10° C./min to control the reaction. The heat-treating process may be performed at the temperature within this range, and thus the ceramic compound may be attached and stabilized on the surface of the core.

In this regard, the core attached with the ceramic compound may be cooled to a temperature of 300° C. at a rate in a range of about 50° C./min to about 200° C./min, and then the resultant may be cooled in the air.

When the method of preparing a positive active material is used, the positive active material may have excellent capacity and lifespan characteristics by securing stability at high voltage.

According to another exemplary embodiment, provided is a positive electrode including the positive active material, and a method of manufacturing the positive electrode will be described along with a method of manufacturing a lithium battery.

The lithium battery according to another embodiment may include a positive electrode including the positive active material; a negative electrode facing the positive electrode; and an electrolyte between the positive electrode and the negative electrode.

The positive electrode may include the positive active material. For example, the positive electrode may be manufactured by preparing a positive active material composition by mixing the positive active material, a conducting agent, and a binder in a solvent; and molding the positive active material composition in a predetermined shape or coating the positive active material composition on a current collector such as a copper foil.

The conducting agent included in the positive active material composition may increase an electrical conductivity by providing a conduction pathway to the positive active material. The conducing agent may include a suitable conducting material used in a lithium battery. Examples of the conducting agent may include a carbon-based material such as carbon black, acetylene black, ketjen black, or carbon fiber (e.g., vapor growth carbon fiber); a metal-based material such as a metal powder or metal fiber of copper, nickel, aluminum, or silver; a conductive polymer such as a polyphenylene derivative; or a conducting material including a mixture thereof. An amount of the conducting agent may be appropriately controlled. For example, a weight ratio of the positive active material and the conducting agent may be in a range of about 99:1 to about 90:10.

The binder included in the positive active material composition may facilitate binding of the positive active material and the conducting agent and binding of the positive active material to the current collector. An amount of the binder may be in a range of about 1 part to about 50 parts by weight based on 100 parts by weight of the positive active material. For example, an amount of the binder may be about 1 part to about 30 parts by weight, for example, about 1 part to about 20 parts by weight, or about 1 part to about 15 parts by weight, based on 100 parts by weight of the positive active material. Examples of the binder may include various polymers such as polyvinylidene fluoride (PVdF), polyvinylidene chloride, polybenzimidazole, polyimide, polyvinyl acetate, polyacrylonitrile, polyvinyl alcohol, carboxymethylcellulose (CMC), starch, hydroxypropylcellulose, reproduced cellulose, polyvinylpyrrolidone, tetrafluoroethylene, polyethylene, polypropylene, polystyrene, polymethyl methacrylate, polyaniline, acrylonitrile butadiene styrene, phenol resin, epoxy resin, polyethylene terephthalate, polytetrafluoroethylene, polyphenyl sulfide, polyamideimide, polyetherimide, polyethylene sulfone, polyamide, polyacetal, polyphenylene oxide, polybutylene terephthalate, ethylene-propylene-diene monomer (EPDM), sulfonated EPDM, styrene butadiene rubber (SBR), fluorine rubber, or a combination thereof.

Examples of the solvent may include N-methylpyrrolidone (NMP), acetone, and water. An amount of the solvent may be about 1 part to about 100 parts by weight, based on 100 parts by weight of the positive active material. When the amount of the solvent is within this range, an active material layer may be easily formed.

In an implementation, a thickness of the current collector may be about 3 μm to about 500 μm, and may be a suitable current collector that does not cause a chemical change to a battery and has high conductivity. Examples of the current collector for a positive electrode may include stainless steel, aluminum, nickel, titanium, calcined carbon, and copper and stainless steel that are surface-treated with carbon, nickel, titanium, or silver. The current collector for a positive electrode may have an uneven micro structure at its surface to enhance a binding force with the positive active material. In an implementation, the current collector may be used in various forms including a film, a sheet, a foil, a net, a porous body, a foaming body, a non-woven body.

The positive active material composition may be directly coated on a current collector, or the positive active material composition may be cast on a separate support to form a positive active material film, which may then be separated from the support and laminated on a copper foil current collector to prepare a positive electrode plate.

The positive active material composition according to an embodiment may be used

The positive active material composition may be printed on a flexible electrode substrate to manufacture a printable battery, in addition to the use in manufacturing a lithium battery.

Separately, for the manufacture of a negative electrode, a negative active material composition is prepared by mixing a negative active material, a binder, a solvent, and, optionally, a conducting agent.

The negative active material may be a suitable material that is used in lithium batteries. Examples of the negative active material may include lithium metal, a metal that is alloyable with lithium, a transition metal oxide, a material capable of doping and de-doping lithium, and a material capable of reversibly intercalating and deintercalating lithium ions.

Examples of the transition metal oxide may include a tungsten oxide, a molybdenum oxide, a titanium oxide, a lithium titanium oxide, a vanadium oxide, and a lithium vanadium oxide.

Examples of the material capable of doping and de-doping lithium may include Si; $SiO_x$ (where, $0<x<2$); a Si—Y alloy (where, Y is an alkali metal, an alkali earth metal, a Group 13 element, a Group 14 element, a Group 15 element, a Group 16 element, a transition metal, a rare-earth element, or a combination thereof, but not Si); Sn; $SnO_2$; and a Sn—Y alloy (where, Y is an alkali metal, an alkali earth metal, a Group 13 element, a Group 14 element, a Group 15 element, a Group 16 element, a transition metal, a rare-earth element, or a combination thereof, but not Sn). Also, at least one of the materials capable of doping and de-doping lithium may be used in combination with $SiO_2$. The element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The material capable of reversibly intercalating and deintercalating lithium ions may be any one of various carbon-based materials that are generally used in a lithium battery. Examples of the material capable of reversibly intercalating and deintercalating lithium ions may include crystalline carbon, amorphous carbon, and a mixture thereof. Examples of the crystalline carbon may include natural graphite and artificial graphite, each of which has an amorphous shape, a plate shape, a flake shape, a spherical shape, or a fiber shape. Examples of the amorphous carbon may include soft carbon (low-temperature calcined carbon), hard carbon, meso-phase pitch carbide, and calcined cokes.

The conductive agent, the binder, and the solvent included in preparing the negative active material composition may be the same with those included in the positive active material composition. In some cases, a plasticizer may be further added to the positive active material composition and to the negative active material composition in order to form pores in a corresponding electrode plate. Amounts of the negative active material, the conducting agent, the binder, and the solvent may be at suitable levels used for a lithium battery.

A negative electrode current collector may have a thickness of about 3 μm to about 500 μm, and may be a suitable current collector that does not cause a chemical change to a battery and has high conductivity. Examples of the current collector for a negative electrode may include stainless steel, aluminum, nickel, titanium, calcined carbon, and aluminum and stainless steel that are surface-treated with carbon, nickel, titanium, or silver. The current collector for a negative electrode may have an uneven micro structure at its surface to enhance a binding force with the negative active material. Also, the current collector may be used in various forms including a film, a sheet, a foil, a net, a porous body, a foaming body, a non-woven body.

The negative active material thus prepared may be directly coated on the current collector for a negative electrode to form a negative electrode plate, or may be case onto a separate support and a negative active material film separated from the support is laminated on the current collector for a negative electrode.

The positive electrode and the negative electrode may be separated by a separator, and the separator may be a suitable separator used in a lithium battery. For example, the separator may include a material that has a low resistance to migration of ions of an electrolyte and an excellent electrolytic solution-retaining capability. For example, the separator may include a material selected from glass fiber, polyester, Teflon, polyethylene, polypropylene, polytetrafluoroethylene (PTFE), and a combination thereof, each of which may be non-woven or woven. The separator may have a pore diameter of about 0.01 μm to about 10 μm, and a thickness of about 5 μm to about 300 μm.

A lithium salt-containing non-aqueous based electrolyte solution may include a non-aqueous electrolyte and a lithium salt. Examples of the non-aqueous electrolyte may include a non-aqueous electrolyte solution, a solid electrolyte, and an inorganic solid electrolyte.

The non-aqueous electrolyte solution may include an aprotic organic solvent, and examples of the aprotic organic solvent may include N-methyl-2-pyrrolidone, propylene carbonate, ethylene carbonate, butylene carbonate, dimethyl carbonate, diethyl carbonate, gamma-butyrolactone, 1,2-dimethoxy ethane, tetrahydrofuran, 2-methyltetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte may include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte may include nitrides, halides, and sulfates of lithium such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt may include a suitable lithium salt used in a lithium battery, and that it is soluble in the lithium salt-containing non-aqueous electrolyte. For example, the lithium salt may include at least one selected from LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, lithium tetraphenyl borate, and lithium imide.

Lithium batteries may be classified as lithium ion batteries, lithium ion polymer batteries, and lithium polymer batteries according to the types of a separator and an electrolyte used therein. In addition, lithium batteries may be classified as a cylindrical type, a rectangular type, a coin type, and a pouch type according to a battery shape, and may also be classified as a bulk type and a thin type according to a battery size. Lithium batteries may be also used either as primary lithium batteries or secondary lithium batteries.

FIG. 1 illustrates a schematic perspective diagram of a structure of a lithium battery according to an exemplary embodiment.

Referring to FIG. 1, the lithium battery 30 may include a positive electrode 23, a negative electrode 22, and a separator 24 disposed between the positive electrode 23 and the negative electrode 22. The positive electrode 23, the negative electrode 22, and the separator 24 may be wound, stacked, or folded, and may then be accommodated in a battery case 25. Subsequently, an electrolyte may be injected into the battery case 25, and the battery case 25 may be sealed by a sealing member 26, thereby completing the manufacture of the lithium battery 30. The battery case 25 may have a cylindrical shape, a rectangular shape, or a thin-film shape. The lithium battery 30 may be a lithium ion battery.

The lithium battery may be suitable to be used as a battery, as power sources, of small-sized devices such as mobile phones or portable computers, or as a unit battery of a battery module including a plurality of batteries in a medium-to-large-sized device.

Examples of the medium-to-large-sized device may include a power tool; an xEV such as electric vehicle (EV), hybrid electric vehicle (HEV), and plug-in hybrid electric vehicle; electric bicycles such as E-bike or E-scooter; an electric golf cart; an electric truck; an electric commercial vehicle; or an electric power storage system. Also, the lithium battery may be suitable for use requiring a high output, a high voltage, and high temperature operability. The lithium battery may be used in applications that require a high voltage range of about 4.3 V to about 4.6 V.

One or more embodiments will now be described in more detail with reference to the following examples. However, these examples are not intended to limit the scope of the one or more embodiments.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example 1

(1) Preparation of 0.5 mol % F-doped LATP

A 0.5 mol % F-doped LATP ($Li_{1.3}Al_{0.3}Ti_{1.7}(PO_{4-y/3})_3F_y$, where y=0.005) was prepared as follows.

12.48 g of $Li_2CO_3$ (purity 99%, 40 mesh, available from Aldrich), 35.41 g of $TiO_2$ (purity 99% or higher, 325 available from Aldrich), 3.99 g of $Al_2O_3$ (150 mesh of activated neutral standard level, available from Aldrich), 103.33 g of $(NH_4)_2HPO_4$ (available from Aldrich), and 0.03 g of LiF were mixed by ball-milling for about 2 hours by using zirconia balls having a diameter of about 5 mm.

Then, the mixture thus obtained was heated from ambient temperature to 300° C. at a temperature increasing rate of about 1° C./min, maintained at 300° C. for 48 hours, and cooled in the air.

Thereafter, the cooled resultant was ball-milled by using zirconia balls having a diameter of about 5 mm for about 19 hours to about 24 hours.

The resultant underwent the ball-milling was heated to a temperature of 900° C. at a temperature increasing rate of about 1° C./min, maintained at 900° C. for 2 hours, cooled to 300° C. at a temperature decreasing rate of about 150° C./min, and then cooled in the air.

The resultant was heated again to a temperature of 1,100° C. at a temperature increasing rate of about 1° C./min, maintained at 1,100° C. for 2 hours, cooled to 300° C. at a temperature decreasing rate of about 150° C./min, and then cooled in the air.

$Li_{1.3}Al_{0.3}Ti_{1.7}(PO_{4-y/3})_3F_y$ (where, y=0.005) obtained after heating three times was ball-milled by using zirconia balls having a diameter of about 5 mm in ethanol for about 48 hours to about 72 hours.

(2) Preparation of $LiCoO_2$ (LCO) coated with F-doped LATP

The ball-milled F-doped LATP was precipitated in ethanol for 7 hours. Then, $LiCoO_2$ was added to the precipitated F-doped LATP. The F-doped LATP and $LiCoO_2$ were ball-milled by using zirconia balls having a diameter of about 5 mm in ethanol for about 24 hours or more.

Then, the ball-milled resultant was heated to a temperature of about 700° C. at a temperature increasing rate of about 1° C./min, maintained at 700° C. for 2.5 hours, cooled to 300° C. at a temperature decreasing rate of about 15° C./min, and then cooled in the air, and thus $LiCoO_2$ coated with the F-doped LATP was prepared.

(3) Preparation of Lithium Battery 94 wt % of the positive active material prepared as described above, 3 wt % of carbon black as a conducting agent, and 3 wt % of PVDF as a binding agent were dispersed in N-methyl-2-pyrrolidone (NMP) to prepare a positive electrode slurry. The positive electrode slurry was coated and dried on an aluminum (Al) thin film, which is a positive electrode current collector, having a thickness in a range of about 20 μm to about 30 μm, and was then roll-pressed, thereby manufacturing a positive electrode.

Metallic lithium was used as a counter electrode to the positive electrode, and an electrolyte solution was prepared by forming a 1.1 M solution of $LiPF_6$ in a mixed solvent of ethylene carbonate (EC), ethyl methyl carbonate (EMC), and dimethyl carbonate (DMC) in a volume ratio of about 3:5:2.

A separator formed of a porous polyethylene (PE) film was interposed between the positive electrode and the negative electrode to form a battery assembly, and this was rolled and pressed to be accommodated in a battery case, and then the electrolyte solution was injected to the battery case, thereby completing manufacture of a lithium battery (coin half cell, 2016 type).

Example 2

A positive active material and a lithium battery were manufactured in the same manner as in Example 1, except that 1.0 mol % of F-doped LATP ($Li_{1.3}Al_{0.3}Ti_{1.7}(PO_{4-y/3})_3 F_y$, y=0.01) was prepared by adding 0.07 g of LiF.

Example 3

A positive active material and a lithium battery were manufactured in the same manner as in Example 1, except that 5.0 mol % of F-doped LATP ($Li_{1.3}Al_{0.3}Ti_{1.7}(PO_{4-y/3})_3 F_y$, y=0.05) was prepared by adding 0.34 g of LiF.

Comparative Example 1

A lithium battery was manufactured in the same manner as in Example 1, except that $LiCoO_2$, which was not treated by coating, was used as a positive active material.

Comparative Example 2

(1) Preparation of LATP

LATP ($Li_{1.3}Al_{0.3}Ti_{1.7}(PO_4)_3$), which was not doped with F, was prepared as follows.

12.5 g of $Li_2CO_3$ (purity 99%, 40 mesh, available from Aldrich), 35.4 g of $TiO_2$ (purity 99% or higher, 325 μm, available from Aldrich), 3.99 g of $Al_2O_3$ (150 mesh of activated neutral standard level, available from Aldrich), and 103.3 g of $(NH_4)_2HPO_4$ (level 1, available from Aldrich) were mixed by ball-milling for about 2 hours or more by using zirconia balls having a diameter of about 5 mm.

Then, the resultant was heated to a temperature of 700° C. at a temperature increasing rate of about 1° C./min, maintained at 700° C. for 2 hours, and then cooled in the air.

Then, the cooled resultant was ball-milled by using zirconia balls having a diameter of about 5 mm for about 19 hours to about 24 hours.

The ball-milled resultant was heated to a temperature of about 920° C. at a temperature increasing rate of about 1° C./min, maintained at 920° C. for 8 hours, cooled to 300° C. at a temperature decreasing rate of about 150° C./min, and then cooled in the air.

$Li_{1.3}Al_{0.3}Ti_{1.7}(PO_4)_3$ prepared by heat-treating two times was ball-milled by using zirconia balls having a diameter of 5 mm in ethanol for about 48 hours to about 72 hours.

(2) Preparation of Positive Active Material and Lithium Battery

A positive active material and a lithium battery were prepared in the same manner as in Example 1, except that a surface of $LiCoO_2$ was coated with LATP prepared above.

Evaluation Example 1: X-Ray Diffraction (XRD) Analysis

Figure 2:
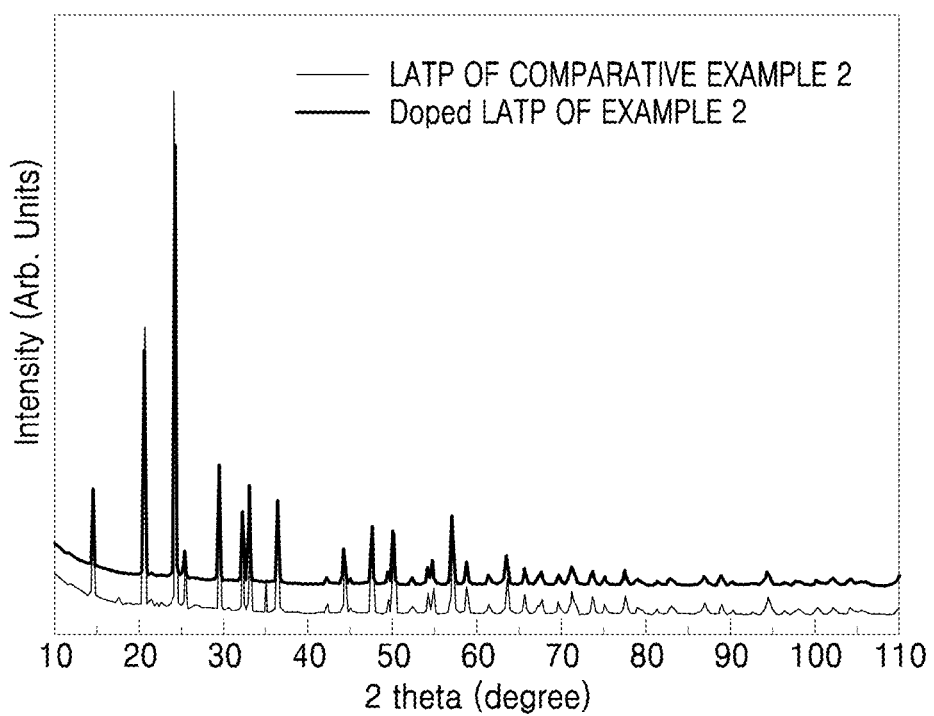
FIG. 2 illustrates the results of XRD analysis performed on a F-doped LATP prepared in Example 2 and a LATP prepared in Comparative Example 2.

X-ray diffraction (XRD) analysis by using an X-ray diffractometer (X'pert PRO MPD, available from PANalytical) was performed on the F-doped LATP prepared in Example 2 and the LATP prepared in Comparative Example 2, and the results of the analysis are shown in FIG. 2. The analysis conditions included a CuK-alpha characteristic X-ray wavelength of 1.541 Å.

As shown in FIG. 2, no significant difference in X-ray diffraction was found between a structure of the F-doped LATP prepared in Example 2 and that of the LATP prepared in Comparative Example 2, and the added LiF did not separately exist in the form of impurity, and thus the F-doped LATP prepared in Example 2 was well doped within a crystal structure.

Evaluation Example 2: SEM-EDS Analysis

A scanning electron microscope/energy dispersive spectroscopy (SEM-EDS) analysis was performed on the F-doped LATP prepared in Example 2 to confirm its image and component element distribution.

Figure 3A:
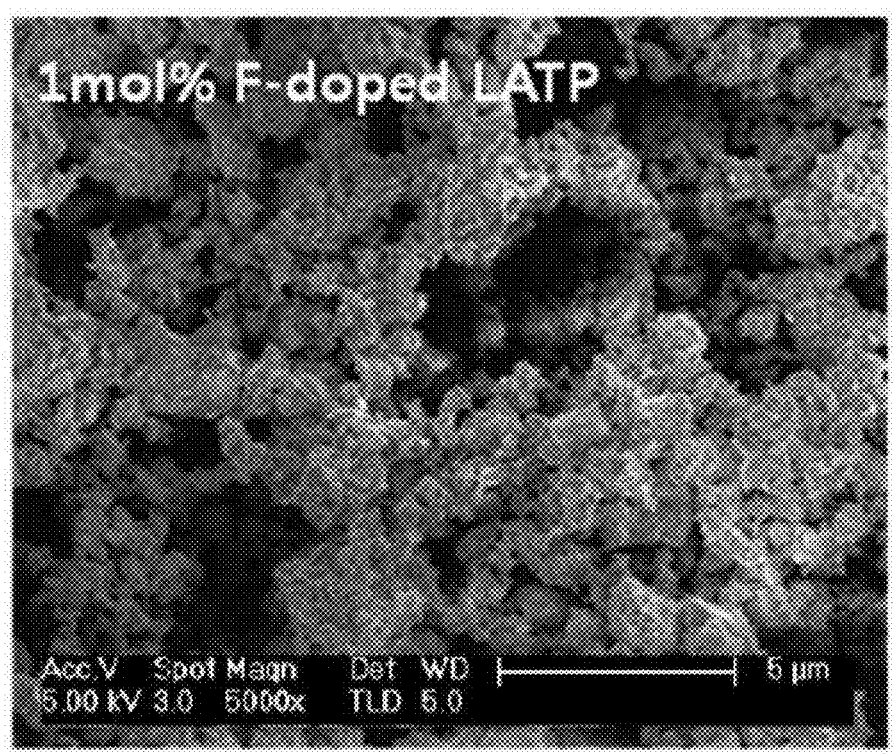
FIGS. 3A and 3B illustrate the results of energy dispersive X-ray spectroscopy (SEM-EDS) performed on the F-doped LATP prepared in Example 2.
Figure 3B:
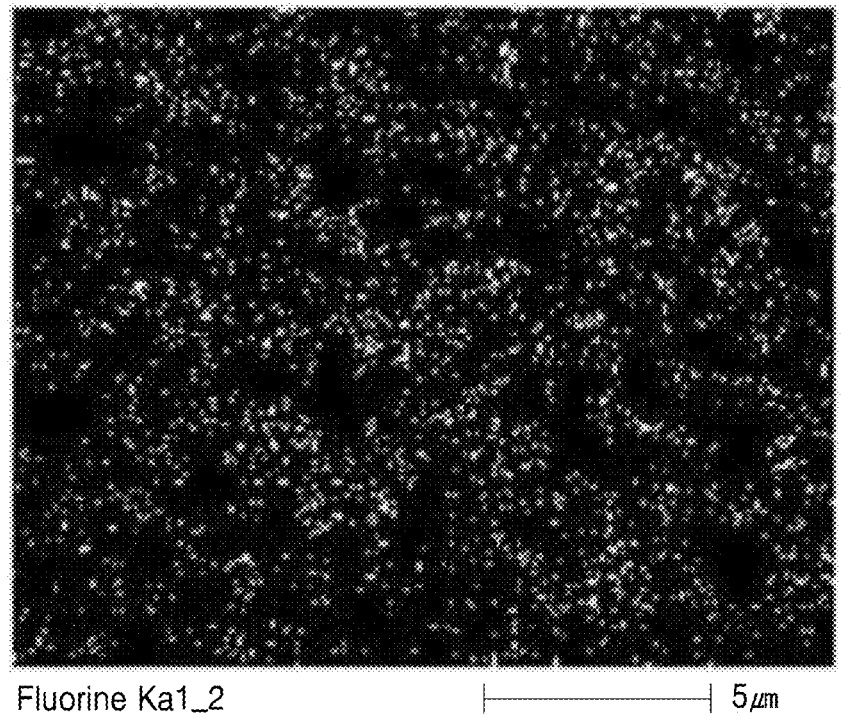

FIGS. 3A and 3B illustrate the results of the SEM-EDS analysis. Referring to FIGS. 3A and 3B, the F-doped LATP was obtained as a powder having a particle diameter of about 0.7 μm. Also, it may be seen that F component was evenly distributed over the whole area by using EDAX mapping.

Evaluation Example 3: Impedance Measurement and Ion Conductivity Evaluation

Figure 4:
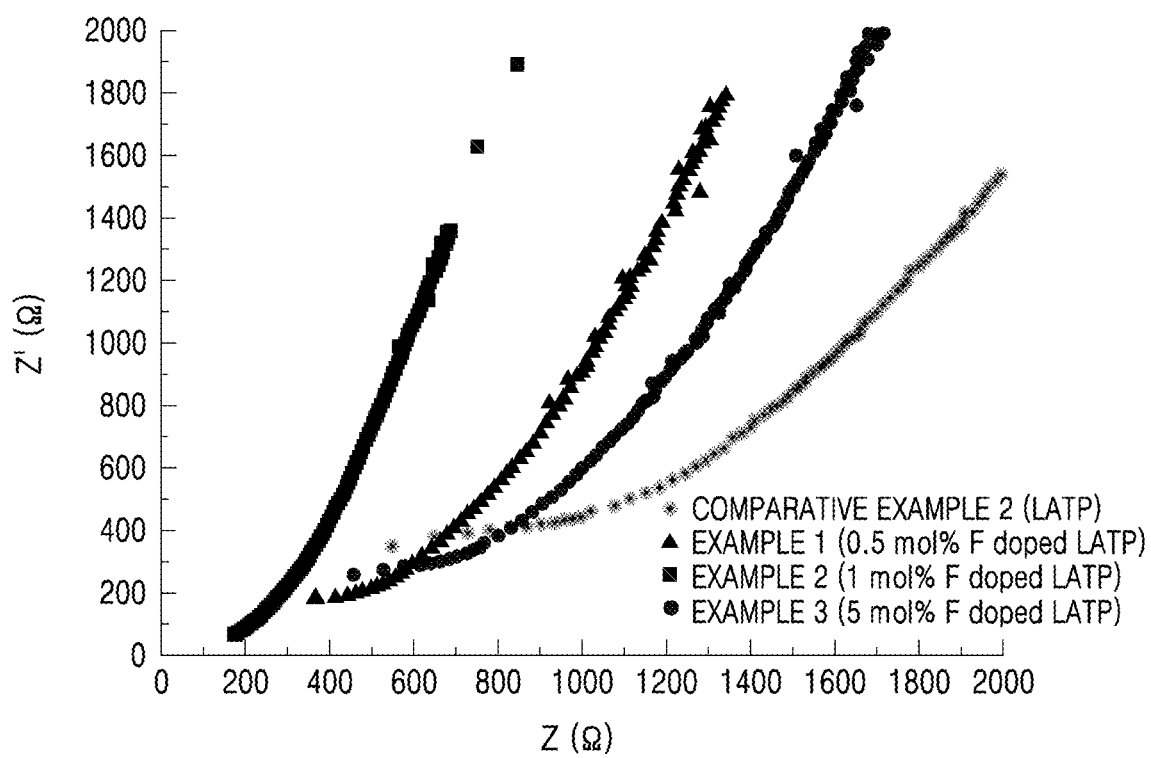
FIG. 4 illustrates the results of impedance measurement performed on the F-doped LATPs prepared in Examples 1 to 3 and the LATP prepared in Comparative Example 2.

Impedances of the F-doped LATPs prepared in Examples 1 to 3 and the LATP prepared in Comparative Example 2 were measured within a frequency range of about 12 Hz to about 10,000 Hz by using an impedance meter LCR-819 (available from Goodwill Instruments), and the results are shown in FIG. 4.

As shown in FIG. 4, the F-doped LATPs prepared in Examples 1 to 3 had lower resistance compared to that of the LATP prepared in Comparative Example 2, which was not doped with F. Among the F-doped LATPs prepared in Examples 1 to 3, the 1 mol % F-doped LATP had the lowest resistance.

Figure 5:
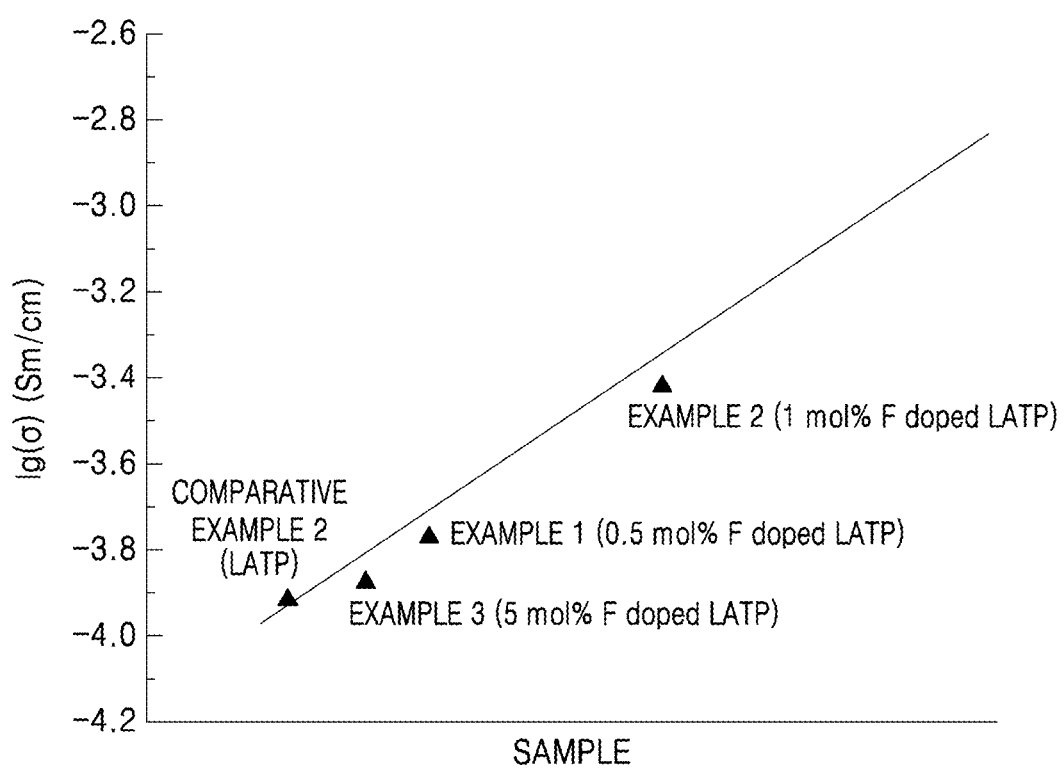
FIG. 5 illustrates the results of ion conductivity measurement performed on the F-doped LATPs prepared in Examples 1 to 3 and the LATP prepared in Comparative Example by using the impedance analysis.

The results of ion conductivity measurement by using the impedance analysis method are shown in FIG. 5.

As shown in FIG. 5, the F-doped LATPs prepared in Examples 1 to 3 had better ion conductivities compared to that of the LATP prepared in Comparative Example 2, which was not doped with F, and among the F-doped LATPs prepared in Examples 1 to 3, the 1 mol % F-doped LATP had the best ion conductivity.

Evaluation Example 4: Evaluation of Battery Characteristics

Lithium batteries prepared in Examples 1 to 3 and Comparative Examples 1 and 2 were charged at a constant current of 0.1 C rate until a voltage reached about 4.6 V (vs. Li) and discharged at a constant current of 0.1 C until a voltage reached about 3 V (vs. Li) at a temperature of 25° C. (formation process).

Each of the lithium batteries after the formation process was charged at a constant current of 0.2 C rate until a voltage reached about 4.6 V (vs. Li) and discharged at the same rate at a temperature of 25° C. Then, the battery was charged at a current of 0.5 C until a voltage reached about 4.6 V, and then discharged at 0.5 C, 1.0 C, or 2.0 C to obtain the corresponding capacity value to evaluate rate characteristics of the battery. Here, an initial efficiency (IE) is defined by a discharge capacity of the $1^{st}$ cycle/a charge capacity of the $1^{st}$ cycle, and a rate characteristic is defined as a ratio of discharge capacity as shown in Table 1 below. The results of rate characteristics evaluation of the lithium batteries prepared in Examples 1 to 3 and Comparative Examples 1 and 2 are shown in Table 1, below.

Also, the lithium batteries prepared in Examples 1 to 3 and Comparative Examples 1 and 2 were charged at a current of 1.0 C and discharged at a current of 1.0 C to analyze a discharge capacity and a capacity retention ratio (CRR) of the lithium batteries. Discharge capacities and capacity retention ratios of the lithium batteries at the $1^{st}$ cycle, $30^{th}$ cycle, and $50^{th}$ cycle are shown in Table 1, and the capacity retention ratio is defined by Equation 1 below.

Capacity retention ratio=[Discharge capacity at each cycle/Discharge capacity at $1^{st}$ cycle]×100     <Equation 1>

TABLE 1

| Sample Name | Positive active material | 1st Cycle | | ICE (%) | Cap. 0.2 D | Rate Properties | | | | | Cycle Properties | | | CRR | |
|---|---|---|---|---|---|---|---|---|---|---|---|---|---|---|---|
| | | 0.1 C | 0.1 D | | | 0.5 D | 1 D | 2 D | 1 D/0.1 D | 2 D/0.2 D | 1st D | 30th D | 50th D | 30 cyc | 50 cyc |
| Comp. Example 1 | Pristine ($LiCoO_2$) | 232 | 223 | 96% | 220 | 215 | 204 | 184 | 91% | 83% | 197 | 139 | 109 | 70% | 55% |
| Comp. Example 2 | 1 wt % LATP coated $LiCoO_2$ | 232 | 227 | 98% | 224 | 221 | 214 | 208 | 94% | 93% | 206 | 167 | 153 | 81% | 74% |
| Example 1 | 0.5 mol % F-doped LATP coated $LiCoO_2$ | 233 | 227 | 98% | 224 | 222 | 217 | 210 | 96% | 94% | 206 | 172 | 160 | 83% | 78% |

TABLE 1-continued

| Sample Name | Positive active material | 1st Cycle 0.1 C | 1st Cycle 0.1 D | ICE (%) | Cap. 0.2 D | Rate Properties 0.5 D | Rate Properties 1 D | Rate Properties 2 D | Rate Properties 1 D/0.1 D | Rate Properties 2 D/0.2 D | Cycle Properties 1st D | Cycle Properties 30th D | Cycle Properties 50th D | CRR 30 cyc | CRR 50 cyc |
|---|---|---|---|---|---|---|---|---|---|---|---|---|---|---|---|
| Example 2 | 1.0 mol % F-doped LATP coated LiCoO$_2$ | 234 | 230 | 98% | 229 | 226 | 224 | 218 | 97% | 95% | 213 | 183 | 175 | 86% | 82% |
| Example 3 | 5.0 mol % F-doped LATP coated LiCoO$_2$ | 231 | 225 | 96% | 224 | 219 | 209 | 207 | 93% | 92% | 204 | 166 | 155 | 81% | 76% |

As shown in Table 1, the rate characteristics of the lithium batteries prepared in Examples 1 to 3 were significantly improved or similar to those of the lithium batteries prepared in Comparative Examples 1 and 2, and thus it may be seen that cycle characteristics and capacity retention ratios of the lithium batteries prepared in Examples 1 to 3 were improved.

Evaluation Example 5: Co Solubility Evaluation

The lithium batteries prepared in Examples 1 to 3 and Comparative Examples 1 and 2 were charged at a constant current of 0.1 C rate until a voltage reached about 4.6 V (vs. Li) and discharged at a constant current of 0.1 C until a voltage reached about 3 V (vs. Li) at a temperature of 25° C. Then, the lithium batteries were charged at a constant current of 0.1 C rate until a voltage reached about 4.6 V (vs. Li) and then the current was cut-off.

The charged electrode was separated from the battery and embedded in an electrolyte solution including 1.1 M LiPF$_6$ in a mixed solvent of EC:EMC:DMC and remained in the electrolyte solution at a temperature of 60° C. for 7 days.

Amounts of cobalt ion detected in the electrolyte solution by using an inductively coupled plasma (ICP) were measured, and the results of the measurement are shown in Table 2, below.

TABLE 2

| | Positive active material | Dissolved Co amount (ppm) |
|---|---|---|
| Comparative Example 1 | Pristine (LiCoO$_2$) | 42.5 |
| Comparative Example 2 | 1 wt % LATP coated LiCoO$_2$ | 15.7 |
| Example 1 | 0.5 mol % F-doped LATP coated LiCoO$_2$ | 10.3 |
| Example 2 | 1.0 mol % F-doped LATP coated LiCoO$_2$ | 9.16 |
| Example 3 | 5.0 mol % F-doped LATP coated LiCoO$_2$ | 11.8 |

As shown in Table 2, it may be seen that elution of cobalt ions from the lithium batteries prepared in Examples 1 to 3 significantly decreased, compared to that of the lithium batteries prepared in Comparative Examples 1 and 2.

By way of summation and review, in some secondary batteries, a positive active material itself may present issues due to a lack of technique to reduce interaction with an electrolyte solution, even when thermal stability is secured at a high voltage of about 4.5 V or higher.

Among positive active materials that are most commonly used in a secondary battery, e.g., LiCoO$_2$ may be doped or coated with a hetero metal material to improve stability of the active material itself, but when this active material is used in a battery, side reactions with an electrolyte solution at a high temperature and a high voltage may be severe, e.g., relative to those at room or ambient temperature, and thus a capacity of the battery could deteriorate as the number of cycle increases. A spinel-based material may have preferable characteristics at a voltage of 5 V and ambient temperature, and thus stability of an active material may be secured, but application of the battery may be difficult due to high-temperature characteristics and Mn elution. In addition, there may be a lack of technique to reduce complicated side reactions caused by interaction with an electrolyte solution in a particular environment.

As described above, according to the one or more of the above embodiments, capacity and lifetime characteristics of a lithium battery may be improved by securing stability at high voltage by surface-treating the positive active material with a lithium ion conductive ceramic compound that has low resistance and high ion conductivity.

The embodiments may provide a positive active material having good capacity and life characteristics at a high voltage.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. A positive active material, comprising:
   a core, the core including a compound capable of reversibly intercalating and deintercalating lithium; and
   a lithium ion conductive ceramic compound coated on a surface of the core in the form of a continuous layer or an island, the ceramic compound being different from the core, having a NaSICON-type crystalline structure, and being represented by Formula 1:

$$Li_{1+x}M_xM'_{2-x}(PO_{4-y/3})_3M''_y$$ [Formula 1]

wherein, in Formula 1,
   M is Al, Cr, Ga, Fe, Sc, In, Y, La, Sc, or a combination thereof;
   M' is Ti, Ge, Zr, or a combination thereof;
   M" is F, S, or a combination thereof;
   $0<x\leq0.7$; and
   $0<y\leq0.05$, and
   wherein the core includes LiCoO$_2$, LiNiO$_2$, LiMnO$_2$, Li(Ni$_a$Co$_b$Al$_c$)O$_2$, Li(Ni$_a$Co$_b$Mn$_c$)O$_2$, where $0<a<1$, $0<b<1$, $0<c<1$ and $a+b+c=1$, LiNi$_{1-Y}$Co$_Y$O$_2$, LiCo$_{1-Y}$ $Mn_yO_2$, $LiNi_{1-y}Mn_yO_2$, where, $0 \leq Y < 1$, $LiCoPO_4$, $LiFePO_4$, $V_2O_5$, TiS, or MoS.

2. The positive active material as claimed in claim 1, wherein the ceramic compound is represented by Formula 2:

$$Li_{1+x}M_xTi_{2-x}(PO_{4-y/3})_3F_y \qquad \text{[Formula 2]}$$

wherein, in Formula 2,
M is Al, Cr, Ga, Fe, Sc, In, Y, La, Sc, or a combination thereof;
$0 < x \leq 0.7$; and
$0 < y \leq 0.05$.

3. The positive active material as claimed in claim 1, wherein the ceramic compound is represented by Formula 3:

$$Li_{1+x}Al_xTi_{2-x}(PO_{4-y/3})_3F_y \qquad \text{[Formula 3]}$$

wherein, in Formula 3,
$0 < x \leq 0.7$, and
$0 < y \leq 0.05$.

4. The positive active material as claimed in claim 1, wherein the ceramic compound is $Li_{1.3}Al_{0.3}Ti_{1.7}(PO_{4-y/3})_3F_y$, in which $0 < y \leq 0.05$.

5. The positive active material as claimed in claim 1, wherein, based on a total weight of the core and the ceramic compound, an amount of the core is greater than about 95 wt % and about 99.9 wt % or less, and an amount of the ceramic compound is about 0.1 wt % or greater and less than about 5 wt %.

6. The positive active material as claimed in claim 1, wherein, based on a total weight of the core and the ceramic compound, an amount of the core is about 96 wt % to about 98.5 wt %, and an amount of the ceramic compound is about 1.5 wt % to about 4 wt %.

7. The positive active material as claimed in claim 1, wherein the ceramic compound is a crystalline solid.

8. A positive electrode for a lithium battery, the positive electrode comprising the positive active material as claimed in claim 1.

9. A lithium battery, comprising:
a positive electrode including the positive active material as claimed in claim 1;
a negative electrode facing the positive electrode; and
an electrolyte between the positive electrode and the negative electrode.

10. The lithium battery as claimed in claim 9, wherein the lithium battery operates within a voltage range of about 4.3 V to about 4.6 V.

11. A method of preparing a positive active material, the method comprising:
preparing a precursor mixture for manufacturing a ceramic compound, the precursor mixture including a fluorine-containing raw material or a sulfur-containing raw material;
obtaining the ceramic compound by heat-treating the precursor mixture;
preparing a coating solution by mixing the ceramic compound in an organic solvent;
coating the coating solution on a surface of a core, the core including a compound capable of reversibly intercalating and deintercalating lithium; and
heat-treating the core coated with the coating solution such that the ceramic compound is coated on a surface of the core in the form of a continuous layer or an island,
wherein the ceramic compound is different from the core, has a NaSICON-type crystalline structure, and is represented by Formula 1:

$$Li_{1+x}M_xM'_{2-x}(PO_{4-y/3})_3M''_y \qquad \text{[Formula 1]}$$

wherein, in Formula 1,
M is Al, Cr, Ga, Fe, Sc, In, Y, La, Sc, or a combination thereof;
M' is Ti, Ge, Zr, or a combination thereof;
M" is F, S, or a combination thereof;
$0 < x \leq 0.7$; and
$0 < y \leq 0.05$, and
wherein the core includes $LiCoO_2$, $LiNiO_2$, $LiMnO_2$, $Li(Ni_aCo_bAl_c)O_2$, $Li(Ni_aCo_bMn_c)O_2$, where $0 < a < 1$, $0 < b < 1$, $0 < c < 1$ and $a+b+c=1$, $LiNi_{1-y}Co_yO_2$, $LiCo_{1-y}Mn_yO_2$, $LiNi_{1-y}Mn_yO_2$, where, $0 \leq Y < 1$, $LiCoPO_4$, $LiFePO_4$, $V_2O_5$, TiS, or MoS.

12. The method as claimed in claim 11, wherein the precursor mixture includes a Li raw material, an Al raw material, a Ti raw material, a $PO_4$ raw material, and the fluorine-containing raw material or the sulfur-containing raw material.

13. The method as claimed in claim 11, wherein the ceramic compound is represented by Formula 3:

$$Li_{1+x}Al_xTi_{2-x}(PO_{4-y/3})_3F_y \qquad \text{[Formula 3]}$$

wherein, in Formula 3, $0 < x \leq 0.7$ and $0 < y \leq 0.05$.

14. The method as claimed in claim 11, wherein heat-treating the mixture to obtain the ceramic compound includes:
a primary heat-treating process that is performed at a temperature of about 650° C. to about 1,000° C. for about 1 hour to about 5 hours; and
a secondary heat-treating process that is performed at a temperature of about 800° C. to about 1,200° C. for about 1 hour to about 10 hours.

15. The method as claimed in claim 11, wherein heat-treating the mixture to obtain the ceramic compound includes:
a primary heat-treating process; and
a secondary heat-treating process that is performed at a temperature greater than that of the primary heat-treating process.

16. The method as claimed in claim 14, wherein heat-treating the mixture to obtain the ceramic compound includes cooling the mixture between performing the primary heat-treating process and the secondary heat-treating.

17. The method as claimed in claim 11, further comprising drying the precursor mixture prior to heat-treating the precursor mixture.

18. The positive active material as claimed in claim 1, wherein M" is S.

19. The positive active material as claimed in claim 1, wherein the core includes $Li(Ni_aCo_bAl_c)O_2$, $Li(Ni_aCo_bMn_c)O_2$, where $0 < a < 1$, $0 < b < 1$, $0 < c < 1$ and $a+b+c=1$, $LiNi_{1-Y}Co_YO_2$, $LiCo_{1-Y}Mn_YO_2$, where, $0 < Y < 1$, $LiCoPO_4$, $V_2O_5$, TiS, or MoS.

* * * * *